Jan. 25, 1966 M. CLAR 3,231,111
COMPACTION APPARATUS AND COMPACTION BODY VEHICLE
Filed May 15, 1963 3 Sheets-Sheet 1

INVENTOR.
MILTON CLAR
BY
Shapiro and Shapiro
ATTORNEYS

Jan. 25, 1966  M. CLAR  3,231,111
COMPACTION APPARATUS AND COMPACTION BODY VEHICLE
Filed May 15, 1963  3 Sheets-Sheet 2

INVENTOR.
MILTON CLAR
BY Shapiro and Shapiro
ATTORNEYS

Jan. 25, 1966    M. CLAR    3,231,111
COMPACTION APPARATUS AND COMPACTION BODY VEHICLE
Filed May 15, 1963    3 Sheets-Sheet 3
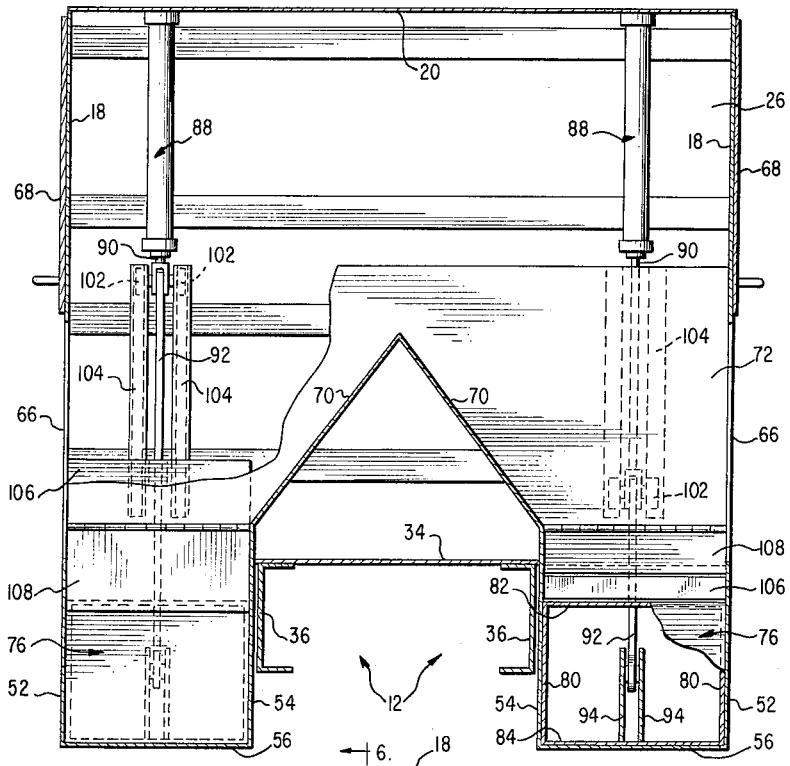
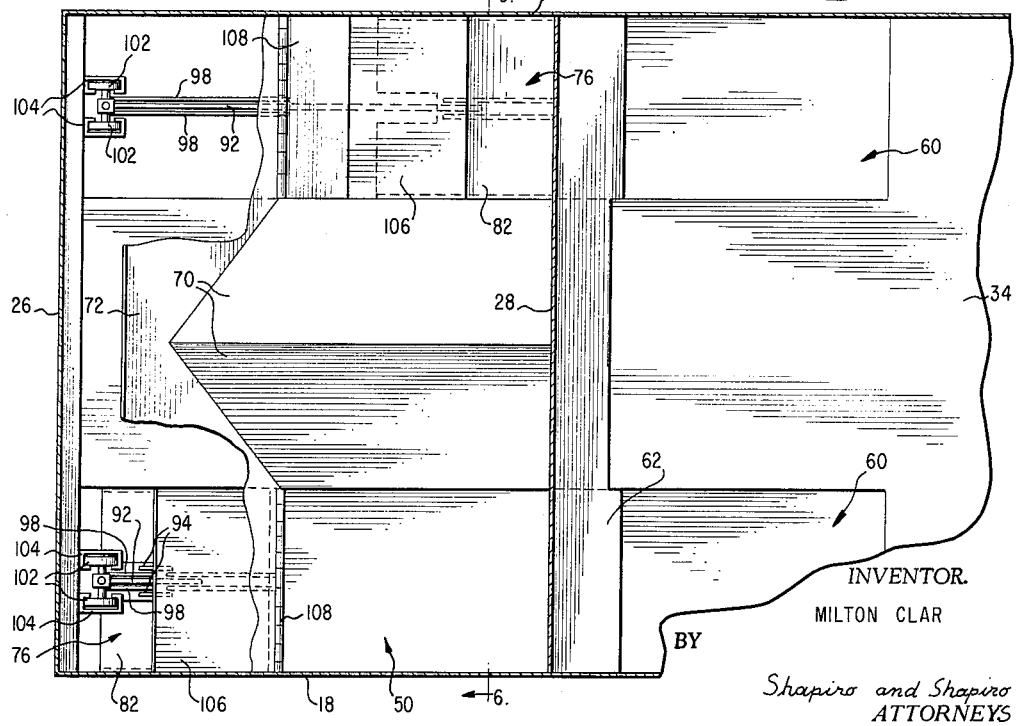
INVENTOR.
MILTON CLAR
BY
Shapiro and Shapiro
ATTORNEYS United States Patent Office 3,231,111
Patented Jan. 25, 1966

3,231,111
COMPACTION APPARATUS AND COMPACTION BODY VEHICLE
Milton Clar, Silver Spring, Md., assignor, by mesne assignments, to Auto Pak Company, Washington, D.C., a corporation of the District of Columbia
Filed May 15, 1963, Ser. No. 280,658
8 Claims. (Cl. 214—83.3)

This application is a continuation in part of Serial Number 276,128, filed April 24, 1963, which is a continuation of Serial Number 138,099, filed September 14, 1961, both entitled "Self-Loading Vehicle," the latter application now being abandoned.

This invention relates to improvements in material collection vehicles and more particularly to improved vehicle bodies and compaction apparatus.

In the refuse collection industry various types of vehicles are employed for the collection of commercial and household waste material. The vehicles employed in commercial collection are usually of the type having a self-loading mechanism for lifting and dumping separate containers which remain at the customer's premises. Front loading and side loading vehicles are the most common types employed for this purpose. For household collection refuse containers are usually emptied manually into the body of the collection vehicle. This burdensome task is facilitated by placement of the access opening of the vehicle body as close as possible to the ground level. However, because the chassis frame of the vehicle tends inherently to have an inconveniently high level, the provision of low loading height in a practical vehicle is not a simple matter.

One of the expedients employed to provide low loading height is illustrated by the so-called rear loading compaction vehicle. Such a vehicle has a body with a material receiver compartment open at the rear of the vehicle for the reception of material. This compartment is behind the chassis proper and hence may have a convenient loading height. However, it is necessary to provide some form of mechanism for moving the material upwardly and forwardly into the main storage compartment of the body.

One of the disadvantages of a rear-loading vehicle of the foregoing type is that the material conveying mechanism must be moved out of the way before the body can be emptied. The side-loading vehicle avoids this problem. In such vehicles low loading height is commonly obtained by "dropping the frame" of the vehicle at the front of the body, behind the operator's cab. This permits the forward portion of the body to be depressed for ease of loading through a side access opening. To move the material from the depressed receiver compartment to the main storage compartment of the body it is again necessary to provide some form of conveyor mechanism, which, as in the rear loader, usually performs the dual function of conveying and compacting the material. While side loading vehicles of this type are easy to empty, because the back of the body is unencumbered, there is little available space for the conveying and compacting mechanism, and the drop frame construction requires a specialized and expensive chassis.

It is accordingly a principal object of the present invention to provide a side loading vehicle having low loading height, but avoiding the drop frame construction.

It is a further principal object of the present invention to provide a vehicle of this type having a unique conveying and compaction apparatus with minimum space requirements and maximum compaction efficiency.

A more general object of the invention is to provide improved material collection vehicles, improved bodies for such vehicles, and improved compaction apparatus.

A more specific object of the invention is to provide, in a vehicle of the foregoing type, compaction apparatus which is entirely contained within the vehicle body, which permits maximum utilization of the existing body capacity for the storage of material, and which is capable of far greater compaction forces than have been obtainable with comparable apparatus known heretofore.

Another object of the invention is to provide a vehicle of the foregoing type having an economical and efficient construction, with access openings and compaction mechanisms at each side of the body.

Still another object of the invention is to provide improved compaction apparatus having substantial mechanical advantage, which produces increasing compaction force as a compaction blade approaches the end of its stroke.

Still another object of the invention is to provide an apparatus of the foregoing type which has shearing action and pre-compaction.

A further object of the invention is to provide apparatus of the foregoing type which utilizes a single vertically arranged hydraulic ram of small size to provide horizontal compaction.

A still further object of the invention is to provide apparatus of the foregoing type having an improved arrangement for receiving material and for shielding the mechanism from the material.

An additional object of the invention is to provide compaction apparatus or the like having a unique arrangement of links for coupling a reciprocative motor to a compaction blade.

Briefly stated, and without intent to limit the scope of the invention, in a specific embodiment the invention comprises a vehicle chassis having a longitudinal frame upon which the vehicle body is supported. The body is provided with a transverse intermediate bulkhead which divides the body into a forward, material receiver compartment and a rearward, material storage compartment. The outer lower portions of the receiver compartment extend below the frame. A passage is provide at each side of the frame from the lower portions of the receiver compartment, through the bulkhead, to the storage compartment, the floor of which is located at the upper level of the frame. Compaction mechanisms are located in the receiver compartment and have reciprocating packer blades arranged to move material through the passages into the storage compartment. The compaction apparatus provides optimum compaction efficiency in a minimum of space and is capable of strong shearing action to break up large objects.

The foregoing and other objects advantages and features of the invention, and the manner in which the same are accomplished with become more readily apparent upon consideration of the following detailed description of the invention taken in conjunction with the accompanying drawings, which illustrate preferred and exemplary embodiments, and wherein:

FIGURE 5 is a fragmentary horizontal section illustrating the material receiver compartment and the forward portion of the storage compartment; and FIGURE 6 is a transverse section taken along the line 6—6 of FIGURE 5.

Figure 1:
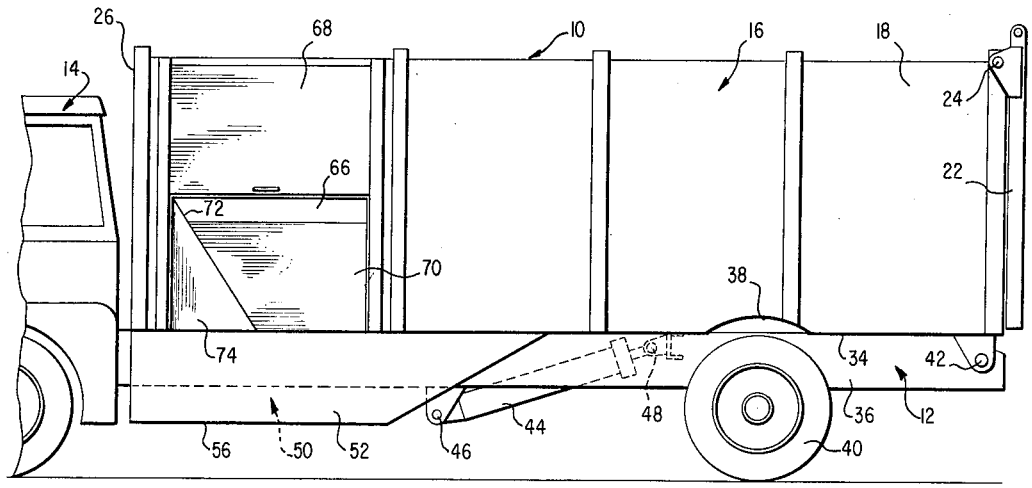
FIGURE 1 is a truncated side elevation view of a vehicle constructed in accordance with the invention.

Turning now to the drawings, and initially to FIGURE 1 thereof, reference numeral 10 designates a vehicle constructed in accordance with the invention and having a conventional truck chassis 12 with an operator's cab 14 at the front of the chassis and a material collection body 16 supported on the chassis rearwardly of the cab. In general, the body may be constituted by the usual shell construction well known in the art. For example, the body may be constructed by attaching steel panels to suitable rigidizing skeletal channels or other members. The body has side walls 18 and a top wall 20. The rear end of the body may be opened and closed by means of a suitable door 22, which may be pivoted at the top of the body, as at 24. Well known mechanisms for opening and closing the door and for latching and unlatching the same may be provided. The body also has a forward wall 26 behind the operator's cab.

Figure 2:
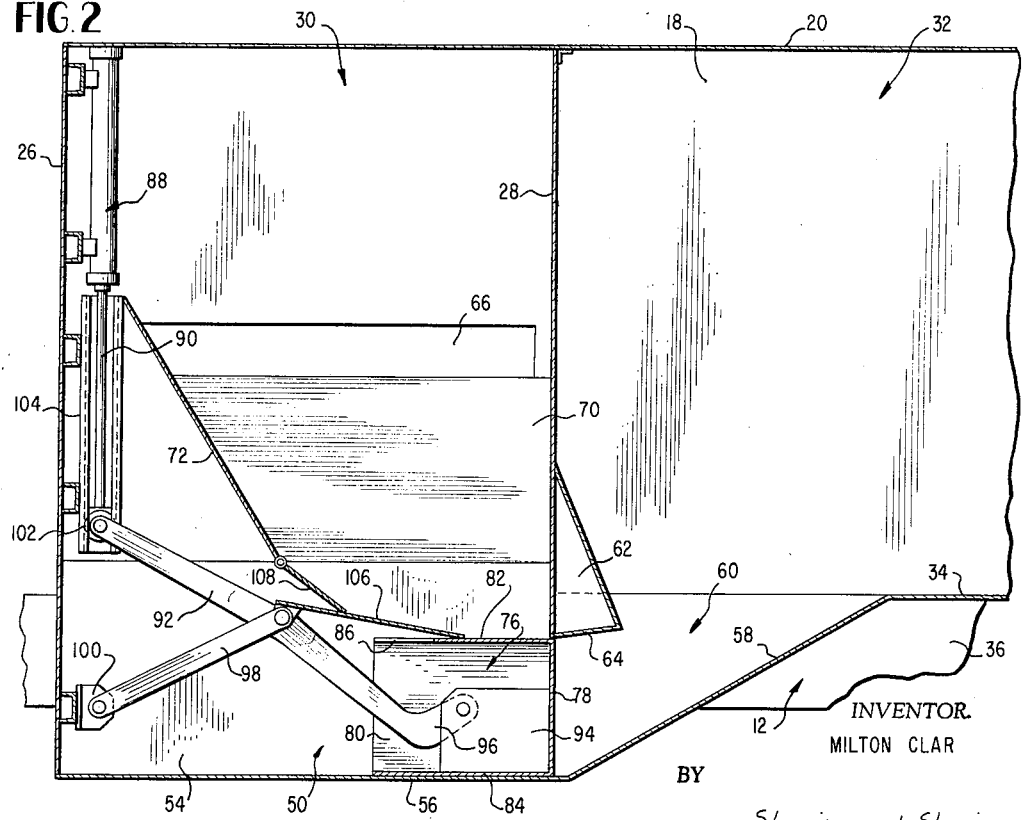
FIGURE 2 is a fragmentary, longitudinal, vertical section illustrating a portion of a vehicle body in accordance with the invention and showing a preferred compaction apparatus with the packer blade fully extended.

As shown in FIGURE 2, for example, a transverse bulkhead 28 is provided intermediate the length of the body to divide the body into a forward, material receiver compartment 30 and a rearward, material storage compartment 32. Since maximum storage space is desired, compartment 32 is much larger in volume than compartment 30. The floor 34 of the storage compartment is located substantially at the upper level of the frame 12, and as shown in FIGURE 6 may be supported directly upon parallel longitudinal frame members 36. As shown in FIGURE 1, the floor is preferably recessed upwardly at 38 over the rear wheels 40 to prevent contact of the body with the wheels when the vehicle suspension is loaded.

The vehicle illustrated in FIGURE 1 is a dump type, and accordingly the entire body is pivoted at 42 upon the rear of the chassis. A hydraulic dumping ram 44 is pivotally connected at 46 to a support below the chassis frame and at 48 to a member fixed to the floor of the body. Dumping action occurs by the extension of the ram in the usual manner.

As shown in FIGURES 2 and 6, the lower portions of the material receiver compartment 30 extend well below the level of the floor 34 to form a pair of troughs 50 at the sides of the vehicle frame. Although two troughs are shown in the preferred form, a trough may be provided at only one side of the vehicle under appropriate circumstances. Each trough has a pair of side walls 52 and 54 and a bottom wall 56 forming a rectangular channel configuration. As shown in FIGURE 2, the bottom wall 56 of each trough is connected to the floor 34 of the storage compartment by a ramp 58 which forms the lower wall of a corresponding passage 60 extending from beneath the bulkhead 28 to the floor 34. The bulkhead terminates short of the bottom wall 56 of each trough so as to provide openings into the passage 60, and the floor 34 is provided with an opening at the exit of each passage as shown in FIGURE 5. The outer side walls of the passages are formed by extensions of the side walls 52 of the troughs, as shown in FIGURE 1. The inner side walls of the passages are extensions of the inner side walls 54 of the troughs. The bottom of the bulkhead 28 is enlarged, as shown at 62, so as to provide a rigid, box-like construction fixed at its ends to the side walls 18. The enlargement 62 has a lower wall 64 spaced from the ramps 58 and converging therewith in a rearward direction. As will be described hereinafter, this construction provides shearing action in conjunction with pre-compaction.

As shown in FIGURE 1, the sides of the material receiver compartment 30 are provided with access openings 66, which may be closed by sliding doors 68 (see FIGURE 6). Opposite each opening 66 is a downwardly and outwardly sloping hopper wall 70 which serves to direct material into the troughs and at the same time provides appreciable loading space inwardly of the openings.

A downwardly and rearwardly sloping wall 72 is provided at the front of compartment 30. While this wall serves as a hopper wall, its principal function is as a baffle to shield mechanism to be described. As shown in FIGURE 1 the sides of the space beneath wall 72 are closed by triangular panels 74.

By virtue of the troughs 50 it is possible to provide low loading height especially convenient for the dumping of household cans and barrels, which may be rested upon the bottom of the openings 66 (or an outward extension not shown) and tipped into the receiver compartment. The dual access openings 66 at the sides of the truck make it possible to serve homes at both sides of a street simultaneously.

It is apparent that some means must be provided for conveying material from the troughs 50 into the storage compartment 32. Moreover, it is desired that this mechanism provide compaction of the material, so that the volume of the storage compartment may be utilized to its full capability. FIGURE 2 illustrates a preferred mechanism for this purpose, comprising for each trough a packer blade or piston 76 of hollow box-like configuration having a rearwardly facing wall 78, a pair of side walls 80, a top wall 82, and a bottom wall 84. The forward end of the packer blade is open, and the top wall 82 is provided with a longitudinal slot 86 extending rearwardly from the open end. As shown in FIGURES 2 and 6, each compaction blade is embraced by the side walls and bottom wall of its trough and is arranged for reciprocation along the trough between a fully extended position shown in FIGURE 2, wherein the wall 78 of the blade extends into and substantially fills the opening below the bulkhead 28, and a fully retracted position shown in FIGURE 3, wherein the blade is under the baffle wall 72.

A reciprocative motor for each trough, in the form of a hydraulic ram 88, is supported vertically upon the forward wall 26 of the body, the piston rod 90 of the ram extending downwardly at the center plane of the trough as shown in FIGURE 6. The lower end of the piston rod 90 is pivotally connected to one end of a link 92, the other end of which is pivotally connected between a pair of plates 92 (see FIGURE 6) fixed within the hollow packer blade 76. Link 92 is slightly bowed rearwardly and has a rearward angulated end 96 adjacent the pivotal connection to the blade. This configuration minimizes the length of sloe 86 in the top wall of the blade required to accommodate link 92 in the retracted position of the blade shown in FIGURES 3 and 4. Another link, 98 (actually a pair of coextensive link parts at the sides of link 92 as shown in FIGURE 4) is pivotally connected at one end to the intermediate region of link 92. Link 98 is pivotally connected at the other end to a support member 100 fixed within compartment 30 and which may be attached to the forward wall 26. As shown, the pivotal connections at member 100 and at piston rod 90 lie along a vertical line, while the pivotal connections at member 100 and the blade lie along a horizontal line. The pivotal connections at the blade, the piston rod, and the intermediate region of link 92 lie along a diagonal line forming the hypotenuse of the right triangle including the aforementioned lines. The hypotenuse is of fixed length, but the remaining sides of the triangle are variable in length in accordance with the position of the packer blade. Link 98 insures that the movement of the packer blade remains horizontal. The pivotal connection of link 92 and the piston rod 90 is provided with rollers 102 (see FIGURES 5 and 6) movable in vertical guide channels 104, which insure vertical movement of the piston rod 90 without undue bending stress upon the rod.

It is apparent that when the piston rod 90 of the hydraulic ram 88 moves downwardly, the packer blade 76 will be moved rearwardly and will force any material within the trough through the opening below bulkhead 28 and into the passage 60. With the arrangement shown, the packing force increases as the blade moves toward the opening beneath the bulkhead, being proportional to the cotangent of the angle between the hypotenuse and the base of the aforementioned triangle. Exceptionally large packing forces are obtainable in the end of the stroke, where maximum packing force is desired, even with a relatively small diameter hydraulic cylinder. For example, a four inch cylinder having a thirty-one inch stroke may be utilized to produce a thirty-six inch blade stroke, with a packing force at the end of the stroke of approximately eighty-one pounds per square inch, for a hydraulic pressure of 1000 p.s.i., and a 432 square inch blade.

Because of the rearwardly diminishing cross sectional area of the passage 60 under bulkhead 28, material is pre-compacted as it passes into the passage. Moreover, the cooperation of the upper rearward edge of the packer blade with the lower forward edge of wall 64 provides a strong shearing action to break up any material which is too large to pass into the passage 60. In actual tests two-by-four wood studs have been readily sheared by this apparatus. In a typical practical embodiment, the packer blade may clear the lower edge of the bulkhead by about a half-inch and may extend into the passage 60 by about a half-inch; the ramp 58 may commence about two inches rearwardly of the forward surface of the bulkhead; and wall 64 may form an angle of about five to ten degrees with the horizontal. The packer blade may be twenty-four inches long and wide and eighteen inches high, with the top of the blade six inches below floor 34.

Figure 3:
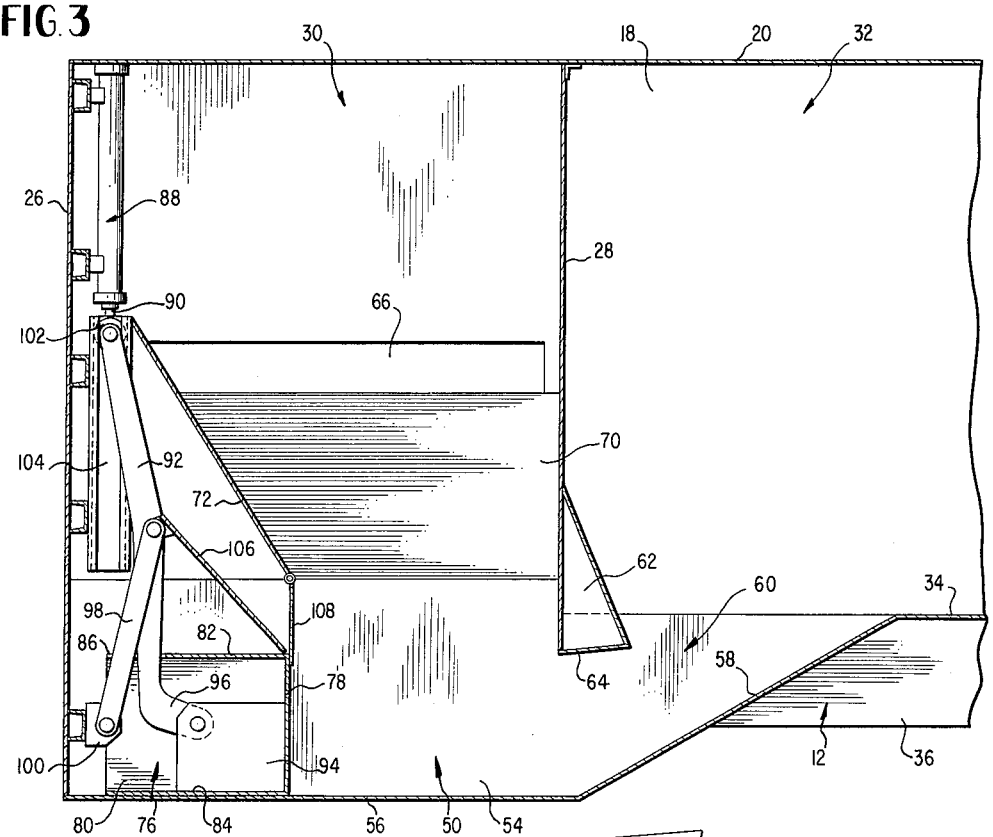
FIGURE 3 is a similar longitudinal sectional view showing the packer blade fully retracted.
Figure 4:
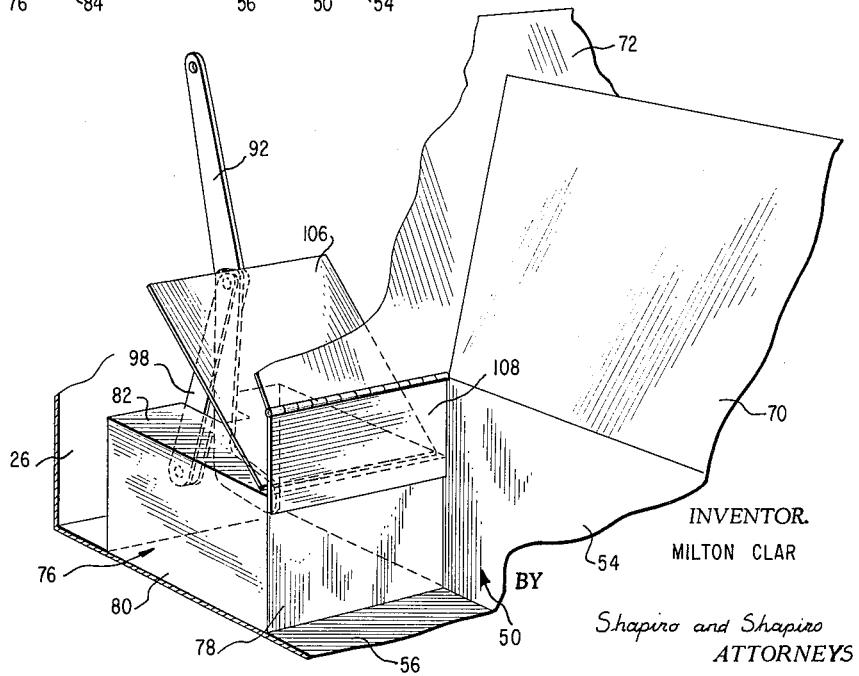
FIGURE 4 is a fragmentary perspective view illustrating the forward portion of the apparatus of FIGURE 3.

When cylinder 88, a double acting type, is operated in reverse, the blade is retracted to its forward position illustrated in FIGURE 3. Links 92 and 98 enter the slot at the top of the packer blade to permit full retraction of the blade, so that there is minimum intrusion into the loading space. It is to be noted that the entire compaction mechanism is readily accommodated within the limited space available in the receiver compartment.

Baffle wall 72 shields the blade and blade linkage in the position shown in FIGURE 3. With the blade extended in the position of FIGURE 2, it would be possible for material to enter the space between the blade and the forward wall 26. The top wall 82 of the blade provides some protection in this respect, but because space requirements dictate that the blade length be relatively small, additional baffling is provided. Thus, in the form shown, a baffle plate 106 extends rearwardly and downwardly from a pivotal connection to the central region of link 92, the lower edge of the plate resting freely upon the top wall 82 of the blade. The baffle plate has sufficient length to insure coverage of the slot 86 when the blade is fully extended as shown in FIGURE 2. An additional baffle plate 108 is preferably pivotally suspended from the lower edge of baffle wall 72. The lower edge of plate 108 is below the top of the blade in the position shown in FIGURE 3 and rests on the baffle 106 during extension of the packer blade as shown in FIGURE 2. When the blade is extended from the position of FIGURE 3, baffle plate 108 pivots out of the way and baffle plate 106 is extended under baffle plate 108 as shown in FIGURE 2. The reverse of this action occurs during the retraction of the blade. Full protection of the compaction mechanism is thus obtained. Moreover, material placed in the receiver compartment when the blade is extended will drop into the trough when the blade is retracted.

The hydraulic rams which form a part of the apparatus of the invention may be actuated from any conventional hydraulic system. A periodically operated flow-divider valve may be utilized to control a pair of compaction rams 88, so that one blade moves forwardly as the other moves rearwardly, thereby minimizing the load on the hydraulic system at any instant.

There will be some tendency for the material on the ramps 58 to return to the receive troughs, but as material is added to the troughs, more and more material will be forced into the storage compartment. When the storage compartment is relatively full, substantial resistance will be offered to the movement of the packer blades, and the material in the storage compartment will be progressively compressed as further material is forced through the passages 60.

The material forced up the ramps will tend to circulate toward the rear of the storage compartment and to be dispersed toward the interior of the compartment. Such dispersal may be assisted, if desired, by providing deflection baffles (not shown) in the storage compartment, particularly adjacent the openings from the passages 60, or by orienting the passages toward the central region of the storage compartment.

From the foregoing description it will be appreciated that the present invention provides material collection vehicles of simplicity, efficiency, and economy, having low loading height, optimum utilization of existing storage capacity, and freedom from encumberances which interfere with emptying the vehicle body. It is also apparent that the invention provides improved compaction apparatus capable of large compaction forces in small space and capable of providing shearing action in conjunction with pre-compaction. Moreover, the compaction linkages of FIGURES 2 and 8 have the advantage of reciprocation guided by the linkage, rather than by the surrounding walls, thereby minimizing wear on the blade and walls and eliminating the need for blade guides. The use of narrow blades and centered linkage eliminates problems of blade canting. The compaction mechanism is readily available for maintenance.

While preferred embodiments of the invention have been shown and described, it will be apparent to those skilled in the art that changes can be made in the said embodiments without departing from the principles and spirit of the invention, the scope of which is defined in the appended claims. For example, under appropriate circumstances certain principles of the invention may be utilized in the absence of other principles. Thus, the compaction apparatus of the invention may be employed in a stationary receiver compartment with removable storage containers, rather than upon a vehicle. Other types of conveying and compaction apparatus may be utilized in the vehicle bodies of the invention. Also a top access opening may be provided for use with a self-loading mechanism. Accordingly, the foregoing embodiments are to be considered illustrative, rather than restrictive of the invention, and those modifications which come within the meaning and range of equivalents of the claims are to be included therein.

I claim:

1. A material collection vehicle comprising a chassis having an operator's cab at the front end thereof, a body supported upon said chassis rearwardly of said cab, said body having an intermediate transverse bulkhead dividing the body into a forward material receiver compartment and a rearward material storage compartment, said receiver compartment having a pair of side walls, a bottom wall, and a forward wall, said storage compartment having a floor above said bottom wall, said bulkhead having an opening adjacent to its lower end for communication between said compartments, said body having a ramp extending from said bottom wall to said floor, said bulkhead opening being located at the lower end of said ramp and said floor having an opening at the upper end of said ramp, a packer blade extending between said side walls and mounted for reciprocation along said bottom wall between a position adjacent to said forward wall and a position adjacent to said bulkhead opening, a hydraulic ram supported vertically on said forward wall and having a piston rod with an end arranged to move vertically, a first elongated link having one end pivotally connected to said end of said piston rod and the other end pivotally connected to said blade for movement about horizontal axes, a second link having one end pivotally connected to said first link for movement about a horizontal axis equidistant from and in a common plane with the first-mentioned axes and having its other end pivotally supported adjacent to said forward wall for movement about a horizontal axis in the plane of vertical movement of said end of said piston rod and in the plane of horizontal movement of the pivotal connection of said first link to said blade, whereby the pivotal axes at the ends of said links define a right triangle with vertical and horizontal sides and with a hypotenuse along the first link, means for causing said hydraulic cylinder to operate through a stroke at one end of which the vertical side of said triangle is substantially longer than the horizontal side and at the other end of which the horizontal side is substantially longer than the vertical side, corresponding to positions of said packer blade adjacent to said forward wall and adjacent to said bulkhead opening, respectively, said receiver compartment having an inclined baffle wall extending transversely between said side walls and positioned adjacent to said forward wall to shield said links when said blade is adjacent to said forward wall, said baffle wall having a lower extremity space above said bottom wall to permit said blade to move below said baffle wall, and additional baffle means for shielding said links when said blade is adjacent to said bulkhead opening.

2. Compaction apparatus comprising a chamber having a bottom wall, a pair of spaced side walls, and a pair of spaced end walls, a packer blade extending between said side walls and movable along said bottom wall toward and away from one of said end walls, a hydraulic ram mounted vertically along said other end wall and having a piston rod with an end arranged to move vertically, a first elongated link having one end pivotally connected to said end of said piston rod and the other end pivotally connected to said blade for movement about horizontal axes, a second link having one end pivotally connected to said first link for movement about a horibontal axis equidistant from the first-mentioned axes and having its other end pivotally supported adjacent to said other end wall for movement about a horizontal axis in the plane of vertical movement of said end of said piston rod and in the plane of horizontal movement of the pivotal connection of said first link to said blade, whereby the pivotal axes at the ends of said links define a right triangle with vertical and horizontal sides and with a hypotenuse along the first link, means for causing said hydraulic cylinder to operate through a stroke at one end of which the vertical side of said triangle is substantially longer than the horizontal side and at the other end of which the horizontal side is substantially longer than the vertical side, corresponding to retracted and extended positions of said blade, respectively, guide means extending along the path of movement of said end of the piston rod, and means movable with said end of the piston rod and engaging said guide means for guiding the vertical movement of said end of the piston rod and absorbing lateral stresses thereon.

3. Compaction apparatus comprising a chamber having a bottom wall, a pair of spaced side walls, and a pair of spaced end walls, a packer blade extending between said side walls and movable along said bottom wall toward and away from one of said end walls, a hydraulic ram mounted vertically along said other end wall and having a piston rod with an end arranged to move vertically, a first elongated link having one end pivotally connected to said end of said piston rod and the other end pivotally connected to said blade for movement about horizontal axes, a second link having one end pivotally connected to said first link for movement about a horizontal axis equidistant from the first-mentioned axes and having its other end pivotally supported adjacent to said other end wall for movement about a horizontal axis in the plane of vertical movement of said end of said piston rod and in the plane of horizontal movement of the pivotal connection of said first link to said blade, whereby the pivotal axes at the ends of said links define a right triangle with vertical and horizontal sides and with a hypotenuse along the first link, means for causing said hydraulic cylinder to operate through a stroke at one end of which the vertical side of said triangle is substantially longer than the horizontal side and at the other end of which the horizontal side is substantially longer than the vertical side, corresponding to retracted and extended positions of said blade, respectively, and an inclined baffle wall extending transversely between said side walls and positioned adjacent to said other end wall to shield said links in the retracted position of said blade, said baffle wall having a lower extremity spaced above said bottom wall to permit said blade to move below said baffle wall.

4. The compaction apparatus of claim 3, said blade being box-like and having a longitudinally slotted upper wall receiving said first link in the retracted position of said blade.

5. The compaction apparatus of claim 3, said other end of said first link being L-shaped.

6. Compaction apparatus comprising a chamber having a bottom wall, a pair of spaced side walls, and a pair of spaced end walls one of which has an opening adjacent to said bottom wall, a storage compartment adjacent to said chamber and communicating therewith through said opening, a packer blade extending between said side walls and movable along said bottom wall toward and away from said opening, a hydraulic ram mounted vertically along said other end wall and having a piston rod with an end arranged to move vertically, a first elongated link having one end pivotally connected to said end of said piston rod and the other end pivotally connected to said blade for movement about horizontal axes, a second link having one end pivotally connected to said first link for movement about a horizontal axis equidistant from the first-mentioned axes and having its other end pivotally supported adjacent to said other end wall for movement about a horizontal axis in the plane of vertical movement of said end of said piston rod and in the plane of horizontal movement of the pivotal connection of said first link to said blade, whereby the pivotal axes at the ends of said links define a right triangle with vertical and horizontal sides and with a hypotenuse along the first link, means for causing said hydraulic cylinder to operate through a stroke at one end of which the vertical side of said triangle is substantially longer than the horizontal side and at the other end of which the horizontal side is substantially longer than the vertical side, corresponding to retracted and extended positions of said blade, respectively, and an inclined baffle wall extending transversely between said side walls and positioned adjacent to said other end wall to shield said links in the retracted position of said blade, said baffle wall having a lower extremity spaced above said bottom wall to permit said blade to move below said baffle wall.

7. The compaction apparatus of claim 6, said chamber having an access opening above said blade, said blade being box-like and having an upper wall cooperating with said baffle wall to shield said links in the extended position of said blade.

8. Compaction apparatus comprising a chamber having a bottom wall and a pair of spaced side walls, a packer blade extending between said side walls and movable along said bottom wall, a reciprocative motor mounted for vertical reciprocation above and behind said packer blade, linkage means connecting said motor to said blade, a baffle wall arranged to shield said linkage means, said baffle wall having a pivotable baffle suspended from the lower edge thereof adjacent to said packer blade at one extremity of its movement, and another baffle having one end pivotally connected to said linkage means and the other end supported on said blade, the last-mentioned baffle being arranged to move from beneath said baffle wall with said blade and to engage said suspended baffle and cause it to pivot.

(References on following page)

References Cited by the Examiner

UNITED STATES PATENTS

| | | | |
|---|---|---|---|
| 31,079 | 1/1861 | Griffin | 100—280 X |
| 45,559 | 12/1864 | Fellows | 100—280 X |
| 263,953 | 9/1882 | Penniston | 100—283 X |
| 502,558 | 8/1893 | Gest | 100—281 X |
| 546,242 | 9/1895 | Nelson et al. | 100—280 X |
| 570,947 | 11/1896 | Neill | 100—179 |
| 652,115 | 6/1900 | James | 100—185 X |
| 1,106,251 | 8/1914 | Stopple | 100—283 X |
| 2,050,806 | 8/1936 | Rey | 214—83.3 |
| 2,267,509 | 12/1941 | Strong | 296—24 |
| 2,487,411 | 11/1949 | Balbi | 214—83.3 X |
| 2,487,729 | 11/1949 | Richardson | 214—83.3 |
| 2,622,748 | 12/1952 | Feidert | 214—83.3 |
| 2,836,316 | 5/1958 | Schonrock | 214—501 |
| 2,850,965 | 9/1958 | Soteropulos | 100—179 |
| 2,878,054 | 3/1959 | Linder | 296—24 |
| 2,934,226 | 4/1960 | Dempster et al. | 214—82 |
| 2,961,105 | 11/1960 | Shubin | 214—83.3 |
| 3,020,830 | 2/1962 | Harrington | 100—209 |
| 3,062,394 | 11/1962 | Bowles | 214—83.3 |

FOREIGN PATENTS

| | | |
|---|---|---|
| 1,106,251 | 8/1955 | France. |

WALTER A. SCHEEL, *Primary Examiner.*

GERALD M. FORLENZA, LOUIS O. MAASSEL,
*Examiners.*